United States Patent
Manin

(10) Patent No.: US 6,999,878 B2
(45) Date of Patent: Feb. 14, 2006

(54) METHOD AND INSTALLATION FOR LOCATING THE POSITION OF THE BOUNDARY FORMED AT THE INTERFACE BETWEEN TWO FLUIDS CONTAINED IN A RESERVOIR

(75) Inventor: Yves Manin, Le Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 224 days.

(21) Appl. No.: 10/481,791

(22) PCT Filed: Jun. 25, 2002

(86) PCT No.: PCT/EP02/07051

§ 371 (c)(1),
(2), (4) Date: Dec. 22, 2003

(87) PCT Pub. No.: WO03/002951

PCT Pub. Date: Jan. 9, 2003

(65) Prior Publication Data

US 2004/0186666 A1    Sep. 23, 2004

(30) Foreign Application Priority Data

Jun. 26, 2001 (FR) ................................. 01 08400

(51) Int. Cl.
*G01V 1/40* (2006.01)
(52) U.S. Cl. .......................................... 702/7; 702/12
(58) Field of Classification Search ............. 702/1–13; 324/330, 339, 355, 338, 357; 166/250.03; 175/45

See application file for complete search history.

(56) References Cited

U.S. PATENT DOCUMENTS

| | | | | | |
|---|---|---|---|---|---|
| 5,678,643 | A | * | 10/1997 | Robbins et al. | 175/45 |
| 5,767,680 | A | * | 6/1998 | Torres-Verdin et al. | 324/355 |
| 6,182,013 | B1 | * | 1/2001 | Malinverno et al. | 702/7 |
| 6,266,619 | B1 | * | 7/2001 | Thomas et al. | 702/13 |
| 6,302,204 | B1 | * | 10/2001 | Reimers et al. | 166/250.03 |
| 6,415,864 | B1 | * | 7/2002 | Ramakrishnan et al. | 166/250.03 |
| 6,441,618 | B1 | * | 8/2002 | Rossi et al. | 324/357 |
| 6,480,000 | B1 | * | 11/2002 | Kong et al. | 324/338 |

* cited by examiner

*Primary Examiner*—John Nastow
*Assistant Examiner*—Victor J. Taylor
(74) *Attorney, Agent, or Firm*—Victor H. Segura; Brigitte L. Echols

(57) ABSTRACT

Process for the location of the position of the interface (5) between two fluids (f1, f2) each contained in a zone (7-1, 7-2) of a reservoir (4) in which: a) a reference transient flow condition that produces a reference pressure difference ($\Delta P_{ref}(t)$), is initiated in a reservoir (4) that comprises at least one pressure sensor (8) located within one of the zones (Z1), b) later an effective transient flow condition that produces a pressure wave which propagates within the reservoir (4) producing an effective pressure difference ($\Delta P_{u1?}(t)$) is initiated, c) the pressure differences ($\Delta P_{ref}(t)$), ($\Delta P_{u1}(t)$) are compared, d) a point in time ($\Delta_1$) that represents the instant when the pressure wave reaches the interface (5) between the two fluids (f1, f2) is determined, the distance ($L_1$) between the interface (5) and the pressure sensor (8) is calculated. The operations b) to d) are repeated in order to monitor movement of the boundary. Application in the petroleum industry.

29 Claims, 4 Drawing Sheets

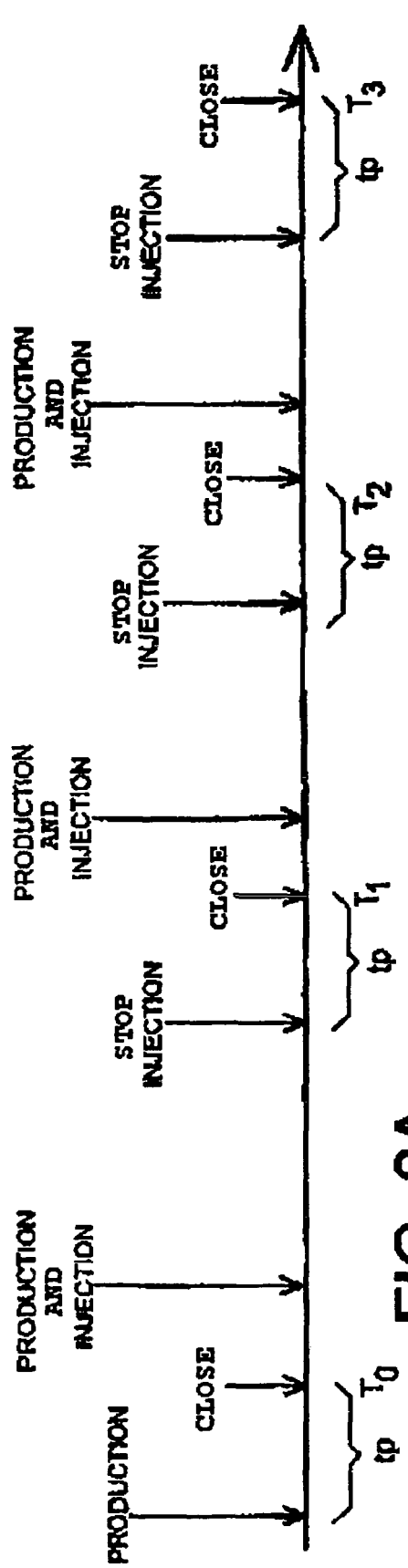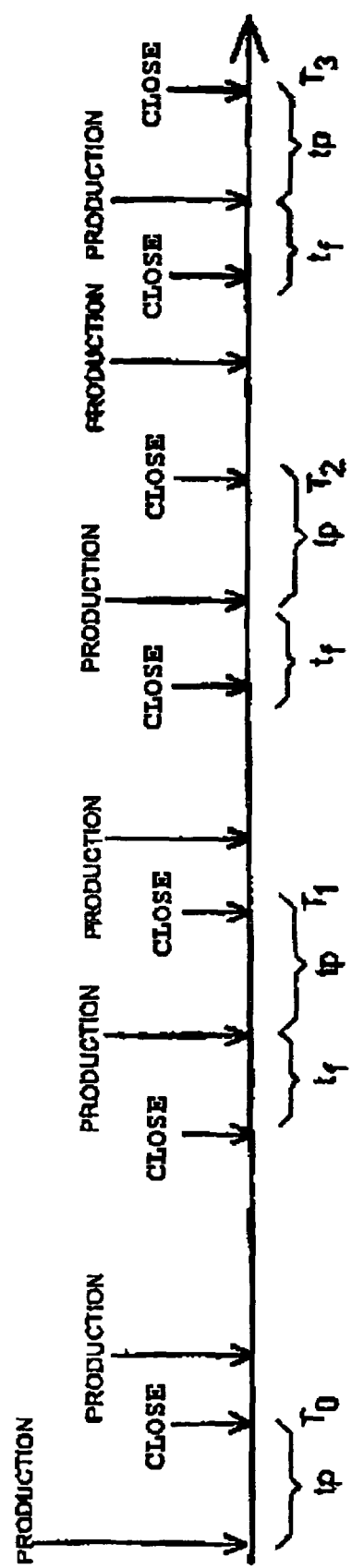

METHOD AND INSTALLATION FOR LOCATING THE POSITION OF THE BOUNDARY FORMED AT THE INTERFACE BETWEEN TWO FLUIDS CONTAINED IN A RESERVOIR

TECHNICAL FIELD

The present invention relates to the location of the position of the boundary formed at the interface between two fluids contained in a reservoir. It has applications mainly in the field of extraction of hydrocarbons.

The production of hydrocarbons arising from an underground source has to be checked and maintained over time, permanently, or selectively, in order to establish the possible causes of flow rate reductions and to predict the risks of a stoppage.

The technique of injection of a fluid under pressure using an injection well in an oil bearing strata to force the petroleum hydrocarbons or gas towards a production well is a technique widely used in the field of extraction, the so-called secondary technique. This fluid raises or maintains the oil bearing strata pressure. This fluid injection technique, usually of water and possibly salt water or a gas is nowadays often utilised during the initial exploitation phase of the oil-bearing deposit. It is important to monitor over time the position of the interface between the fluids in order to halt production before the injected fluid reaches the production well.

The desired objective is to maximise the recovery of hydrocarbons, the movement of which by the water or gas has to be achieved in the most uniform manner.

Within the same objective, it is also important to be able to follow the movement of the zones of water or gas, associated with the oil bearing strata which are likely to approach the production wells as the hydrocarbon production process progresses.

BACKGROUND OF THE PRIOR TECHNOLOGY

Currently few processes will allow the movement of the boundary formed between the two fluids to be monitored continuously.

The processes in existence are basically nuclear, electrical and seismic.

It is possible to sink inspection wells between the injection well and the production well and from these produce a series of diagraphs of the resistivity or nucleation. These show the variation in saturation of the fluids being monitored, usually salt water around the inspection well, normally within a range of about a meter. The extent of investigation is limited and it is necessary to generate a large number of inspection wells in order to track the movement of the boundary, the injection well being located at several hundreds of meters from the production well. The multiplication of the quantity of inspection wells is very expensive.

It is desirable that the two fluids have sufficiently different resistivities, which is the case for salt water and hydrocarbons.

This difference is thus approximately 1 to 100, if not the measurements are insignificant and their interpretation becomes very difficult.

A process of seismic inspection in four dimensions includes the use of repeated measurements of the time taken by sound waves to cross a predetermined thickness of the geological formations located between a sound wave generator source at the surface or below it and microphones installed at various depths. The velocity of propagation of the sound waves in the rocks is a function of several factors notably their porosity and the type of fluids contained within them and the pressure. The installation of the equipment needed to perform the measurements is very complicated especially if the oil bearing strata concerned are beneath the sea-bed.

It is desirable that the two fluids have sufficiently different densities so that the measurements have a high sensitivity thus making the interpretation simple. Such is the case if one of the fluids is a gas and the other a liquid.

DESCRIPTION OF THE INVENTION

The present invention aims to rectify the inconveniences associated with electrical and seismic methods by proposing a method that allows the position of the boundary between two fluids to be monitored by using pressure measurements, this method is less costly than classical methods, since it is easier to use than classical seismic methods, and allows a much enhanced extent of investigation when compared to earlier classical electrical methods. Furthermore, the method is compatible with fluids having similar densities and/or electrical resistivities. The parameter that sets the sensitivity of the method proposed is mainly associated with the ratio of the viscosity between the two fluids.

Generally speaking, the invention is a method of locating the position of the interface between two fluids each contained within a zone in a reservoir. The following steps are involved:

a°) within the reservoir a transient reference flow that produces a difference of reference pressure is generated and this is measured using a pressure sensor, at least one of which is installed in one of the zones, b°) later an effective transient flow condition is established, that is similar to the reference transient flow condition, this reference transient flow condition generates a pressure wave that propagates within the reservoir and creates an effective pressure difference that can be measured with the pressure sensor, c°) the differences in pressure measured are compared over time or as a function of time, d°) from the comparison can be calculated a point in time representing the moment when the pressure wave reaches the interface between the two fluids, this point in time allowing the distance between the interface and the pressure sensor to be calculated at the moment when the effective transient flow condition occurs.

In order to follow the movement of the interface over time, the stages b to d can be repeated one or more times.

The distance between the pressure sensor and the interface is given by a formula of the type:

$$L_1 = \alpha \sqrt{\frac{k_1 \cdot \delta_1}{\phi_1 \cdot \mu_1 \cdot Ct_1}}$$

in which:

$\alpha$ is a conversion factor which in the international system is equal to 2, $k_1$ is the horizontal permeability of the zone in which the pressure sensor is located, $\Phi_1$ is the porocity of the zone in which the pressure sensor is located, $\mu_1$ is the viscosity of the fluid contained in the zone in which the pressure sensor is located, $Ct_1$ is the total compressibility of the zone in which the pressure sensor is located.

The comparison may be made by comparing the measured pressure differences between the reference and effective pressures. However, it is possible that the comparison can be achieved by using a function of the difference, for example a derivative of the difference.

The time function may be a logarithmic function.

When the comparison between the reference and effective pressure differences is shown graphically, a change in the gradient occurs at the point in time when the pressure wave arrives at the interface.

The reference and effective transient flow condition may be generated as a result of a change in the flow in at least one of the production wells used to extract one of the fluids. The change in flow rate could result from the closure of the production well.

The other fluid can be injected into the reservoir or may find its way there naturally. In the former case, the injection of the other fluid begins after measuring the reference flow variation. This injection is terminated before the effective transient flow condition is initiated and continues after measuring the variation in the effective flow.

It is preferable that one of the fluids is extracted by at least one of the production wells during a period tp prior to initiating the reference transient flow condition.

So that the transient changes in reference and effective flows are similar, the duration of halting the injection prior to initiating the effective transient flow condition can be largely the same as the production duration prior to initiating the reference transient flow condition.

Similarly, when there is no injection, the production well can function for largely the same time preceding the initiation of the reference transient flow condition and preceding the initiation of the effective transient flow condition.

It can be halted before the beginning of the period of production preceding the initiation of the effective transient flow condition.

The present invention also concerns an installation for the location of the position of the interface between two fluids each contained within a zone of a reservoir. It comprises within the reservoir, into one of the zones of which is installed at least one pressure sensor, methods for initiating a reference transient flow condition, that produces a variation in reference pressure and later, an effective transient flow condition similar to the reference transient flow condition, this effective transient flow condition generating a pressure wave that propagates in the reservoir and produces a variation in the effective pressure, these variations in reference and effective pressures being measured by the pressure sensor, methods for comparing the differences in pressure over time or as a function of time and in order to calculate from the comparison a representative point in time when the pressure wave reaches the interface between the two fluids, methods in order to calculate, using this timing, the distance between the interface and the pressure sensor when the effective transient flow condition is applied.

The methods for the initiation inside the reservoir of the reference transient flow condition and the effective transient flow condition may be achieved using at least one valve controlling the flow to at least one production well located in one of the zones used to extract the fluid contained therein.

The pressure sensor may be sited either in the production well or in another dedicated well remote from the production well.

The installation may comprise an injection well for the injection of other fluids into the reservoir, this other fluid facilitating the extraction of the first fluid.

When the effects of gravity can be considered as negligible in the reservoir, a single pressure sensor suffices, but if this is not the case, it is preferable to distribute several pressure sensors evenly over the height of the reservoir.

When the reservoir comprises several separate productive layers that are not interconnected, it is preferable to site at least one pressure sensor in each productive layer.

In this configuration, in order to ensure that the measurements do not overly disturb production, it is preferable to fit the production well with a method of halting the production from one of the layers without halting production from the well.

To avoid errors in the pressure sensor measurements, it is preferable to isolate the section of the well where it is sited from the section of the well where any other pressure sensor is sited.

BRIEF DESCRIPTION OF THE DRAWINGS

The present invention will be better understood by reading the description of the examples of the embodiments described, which are given simply as examples and non-exhaustive by reference to the drawings at annex in which:

FIGS. 2A and 2B are timelines showing the different phases of the process according to the invention within the framework of FIGS. 1A and 1B respectively;

DETAILED DESCRIPTION OF THE PREFERRED EMBODIMENTS

Figure 1A:
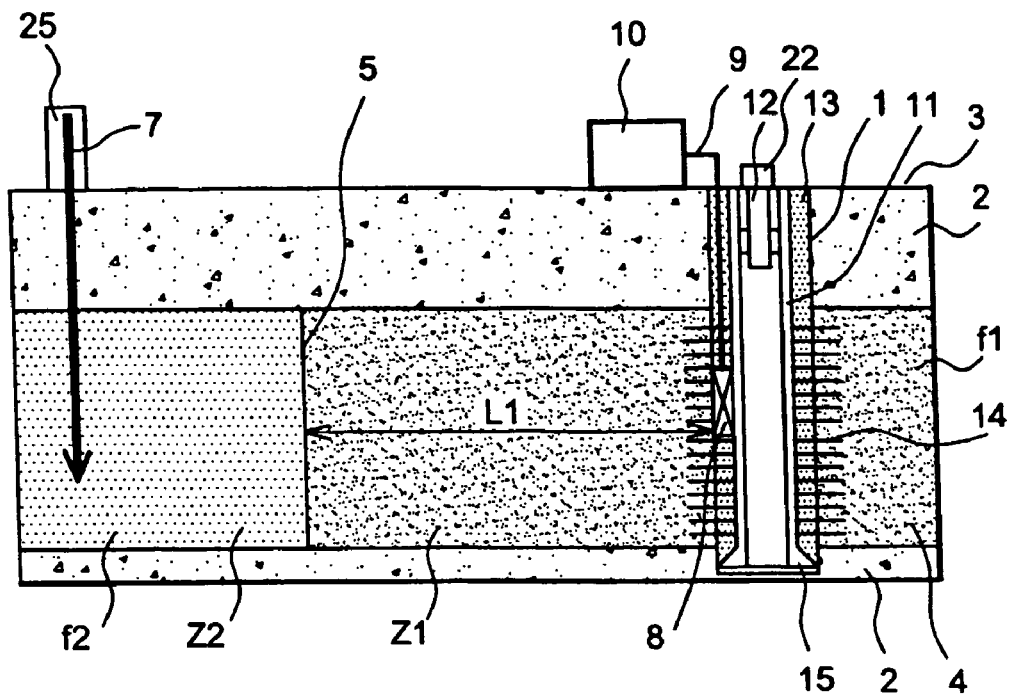
FIGS. 1A and 1B represent two examples of the installation according to the invention used to locate the position of the interface between two fluids.
Figure 1B:
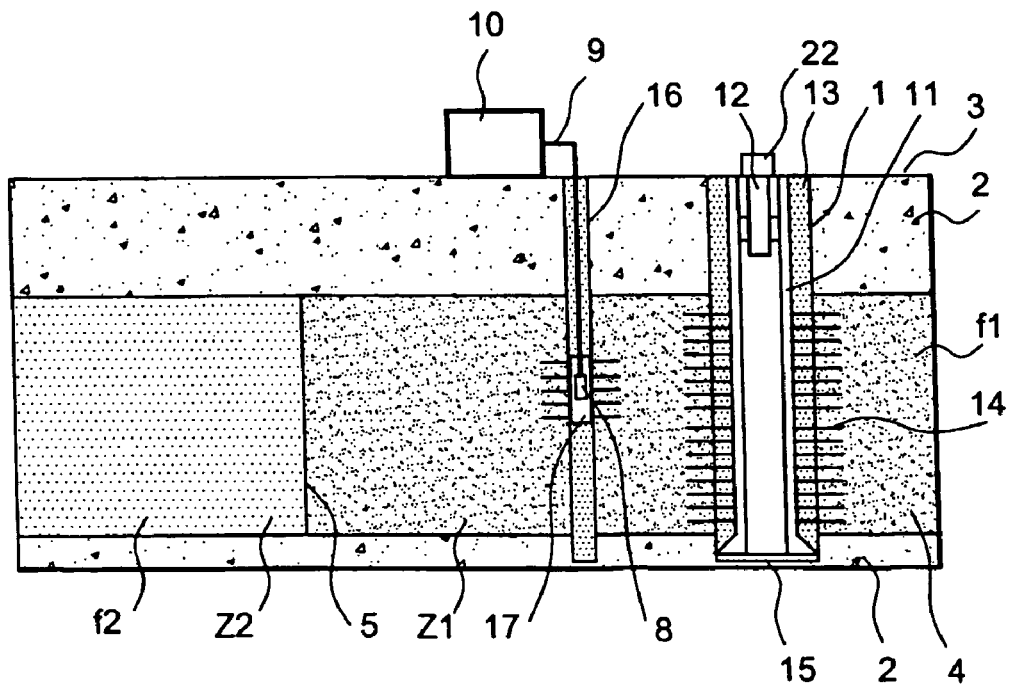

Reference is made to FIGS. 1A and 1B which show a cross section of example installations according to the invention used to ascertain the position of the interface between two fluids f1, and f2 in a reservoir 4. Represented diagramatically is a production well 1, this well 1 passing through terrestrial formations 2 and meeting the surface 3 of the earth's crust. The reservoir 4 is located in the terrestrial formations 2.

The reservoir 4 contains the first fluid f1 in a zone Z1, being crude oil or gas to be extracted and raised to the surface via the production well 1. The production well 1 passes through the reservoir 4 in the zone Z1.

In zone Z2 the reservoir 4 also contains the second fluid f2 which is at the interface 5 with the first fluid f1. This second fluid f2 can be water or possibly salt water or gas. This second fluid f2 can be, as in FIG. 1A, injected into reservoir 4 to force the first fluid f1 towards the production well 1 by either increasing or maintaining the pressure in the reservoir 4. The injection of the second fluid is performed using an injection well 7 drilled in the terrestrial formations 2 and finishing in the reservoir 4. The injection well 7 is shown diagrammatically in FIG. 1A by an arrow. It can be located at several hundreds of meters from the production well 1.

Instead of being injected, this second fluid f2 can be naturally present within the reservoir 4 as shown diagrammatically in FIG. 1B. In this variant there is no injection well 7.

In FIG. 1A, it is assumed that at least one pressure sensor 8 is sited in the production well 1 at a depth corresponding to the reservoir 4. This pressure sensor 8 is connected by a cable 9 to the control and analysis system 10 sited at the surface and capable of sending and receiving sensor information, and of performing data analysis on the pressure information provided by the sensor.

The pressure to be measured by the sensor 8 is that which exists in the reservoir 4 in the area where it is sited. The pressure measurement operations used in hydrocarbon production wells are well understood.

The method of control and data analysis 10 may comprise a computer able to control the well production 1 status, i.e. operating or shut down, and the status of the injection well 7, i.e. injection or not of the second fluid f2.

There now follows a brief description of the structure of the production well 1 and the location of the pressure sensor 8.

The production well 1 contains a casing 11 and inside the casing 11, and mounted concentrically with it, is a production pipe 12 used to carry the fluid f1 to be extracted from the reservoir 4 to the surface 3. The lower end of the casing 11 is fitted with a casing end shoe 15 used to protect it and facilitate its installation into the well.

The pressure sensor 8 is lowered together with its cable 9, preferably within the annular space between the outer wall of the casing 11 and the wall of the well 1. It is held in place at the correct depth with cement 13, the cable 9 following the outer wall of the casing 11.

The pressure sensor 8 could equally have been located in the annular space between the inner wall of the casing 11 and the outside wall of the production pipe 12.

Channels 14 drilled into the cement 13 and extending into the reservoir formation 4 on the one hand and into the casing 11 on the other hand, on both sides of the pressure sensor 8, allow the fluid f1 being extracted to enter the casing 11 where it may reach the production pipe 12. They also allow a pressure sensor 8 to be subjected to the same pressure existing within the reservoir 4. The production of these channels 14 is achieved using known techniques of directionally focused explosions.

The design could also have envisaged, as shown in FIG. 1B, that the pressure sensor 8 is not sited in the production well 1, but installed in a dedicated well, such a measurement well 16 drilled in the terrestrial formations 2 and passing through the reservoir 4. It could also have been located in the injection well 7. In the example described, the measurement well 16 is located at some distance from the production well 1 (for example several hundreds of meters) in the zone Z1 where the first fluid to be extracted f1 is to be found, but it could also have been sited in the other zone Z2.

The pressure sensor 8 is fixed to the outer wall of a tube 17 and joined to its cable 9 and lowered into the measurement well 16 which can be left without a casing. The pressure sensor 8 is fixed in position using cement 13, that prevents the fluid f1 from rising in the well and the channels 14 in the cement 13 that extend into the terrestrial formation and so allowing the pressure sensor 8 to be subjected to the same pressure as the reservoir 4.

The fact that the pressure sensor 8 is sited permanently in a well whether it is the production well 1 or another well associated with the production well 1 enables a series of measurements to be made at intervals during the life of the production well 1.

In these first examples, it is assumed that the reservoir 4 is comprised of a single relatively narrow layer, of a largely homogeneous productive formation. The effects of gravity on the behaviour of the fluids f1, f2 can be neglected. For this reason the interface 5 between the two fluids f1, f2 has been shown as approximately vertical and parallel with the production well 1 and measurement well 16. A single pressure sensor 8 is all that is required to establish the location of interface 5.

The process for locating the position of the interface 5 between the two fluids f1, f2 may be performed as follows. Reference should be made to the timeline in FIG. 2A.

At the start of production of the production well 1, following a period $t_p$ of production, a reference transient flow condition is installed in the reservoir 4 at a time $T_o$. The reference transient flow condition produces a reference pressure difference $\Delta P_{ref}(t)$ which is measured by the pressure sensor 8. This reference transient flow condition can be created by a reduction in the production flow rate or preferably by closing down the production well 1. To achieve this, the production well 1 is fitted with methods 22 of controlling the extraction flow rate of the well, these methods 22 may take the form of at least one valve fitted to the extraction pipe 12 either below or on the surface.

Such a pressure measurement operation following the closure of the production well is known in English as the "pressure build-up test". Such pressure build-up tests are understood and conducted individually in order to establish the permeability of the terrestrial formations, the extent of a reservoir or the presence of heterogeneity in a formation.

If the fluid f2 for which the boundary interface location is required is injected into the reservoir 4, the injection process is only initiated following the measurement of the reference pressure difference $\Delta P_{ref}(t)$.

The injection well 7 is equipped with methods 25 for controlling the injection of the second fluid f2. These methods 25 may take the form of at least one valve fitted above or below the surface.

At a later time $T_1$ an effective transient flow condition is initiated in the reservoir 4, similar to the reference transient flow condition. This effective transient flow condition creates a pressure wave that propagates in the reservoir 4 and produces an effective pressure difference $\Delta P_{u1}(t)$ that is measured by the pressure sensor 8.

In the example, the interface 5 between the two fluids f1, f2 has come closer to the pressure sensor 8 during the points in time $T_o$ and $T_1$. The effective transient flow condition is produced in the reservoir 4 under conditions that are largely the same as those that existed when the reference transient flow condition was initiated. For this to happen, the production of well 1 may continue without injecting fluid f2 into the reservoir 4 during approximately the same period $t_p$ preceding the point in time $T_1$, that, in the example was the instant when the production well 1 was closed.

In the example of FIG. 1B where the fluid f2 is not injected into the reservoir 4, but finds its way there naturally, in order to achieve the same conditions at the point in time T1, as at the point in time $T_o$, at a point in time $T_1-t_p$ the production well 1 can be opened, the latter having been closed during a period $t_1$ preceding the point in time $T_1$–$t_p$. This is described in the timeline graph in FIG. 2B.

The two pressure differences $\Delta P_{ref}(t)$ and $\Delta P_{u1}(t)$ are compared over time or as a function of time and from this comparison, the point in time $\delta_1$ which represents the moment when the pressure wave reaches the interface 5 between the two fluids f1, f2 may be deduced. Knowing the point in time $\delta_1$ allows the distance $L_1$ between the pressure sensor 8 and the interface 5 between the two fluids f1, f2 at the moment of the effective transient flow condition $\Delta P_{u1}(t)$ to be calculated. The comparison, the determination of the point in time $\delta_1$ and the calculation of the distance $L_1$ are performed by the control and data analysis system 10.

The velocities of the movement of the interface 5 are small and the transient flow conditions that are acquired may last for one or several days, the longer the acquisition lasts, the more extensive the investigation.

The benefit of initiating two transient flow conditions is that those effects not associated with the interface 5 and its movement can be ignored.

Figure 3:
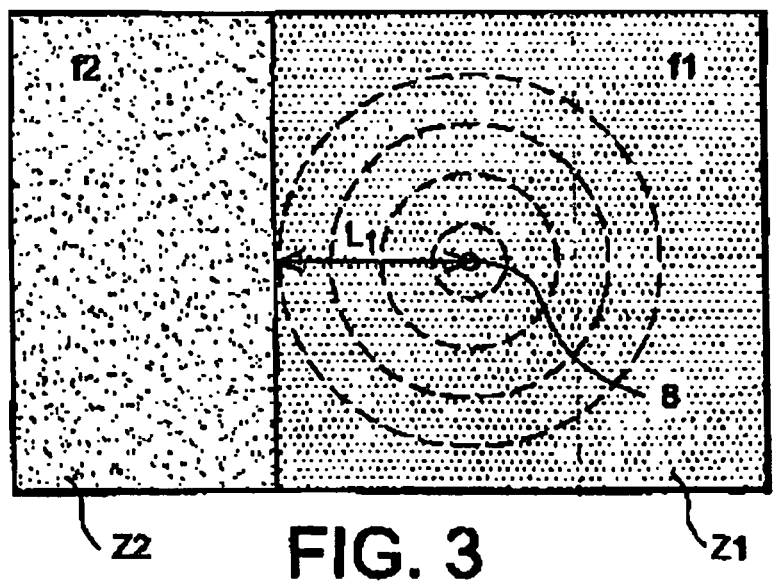
FIG. 3 represents a view from above of a model used to establish the formula used to calculate the distance between the interface and the pressure sensor.

In the case where the pressure sensor 8 is sited in the production well in the zone Z1, the path of the pressure wave that results from the transient flow condition is shown schematically in FIG. 3. The zone Z1 is adjacent to the zone Z2 that contains the second fluid f2. The interface between the two fluids f1, f2 takes the form of a surface situated at a distance $L_1$ from the pressure sensor 8. This model is shown at FIG. 3. The distance $L_1$ between the sensor and the position of the interface is given by the formula of the type (1), established using a priori information based on the accuracy of pressure measurement.

$$L_1 = \alpha \sqrt{\frac{k_1 \cdot \delta_1}{\phi_1 \cdot \mu_1 \cdot Ct_1}} \quad (1)$$

where:

$\alpha$ is a conversion factor which in the international system is equal to 2, $k_1$ is the horizontal permeability of the zone Z1, $\Phi_1$ is the porosity of the zone Z1, $\mu_1$ is the viscosity of the fluid f1 in the zone Z1, $Ct_1$ is the total compressibility in the zone Z1 where the compressibility $Ct_1$ is given by:

$Ct_1 = C + S_{f1}C_{f1} + S_{f2}C_{f2}$ where:

C is the compressibility of the productive formation in the zone Z1, $S_{f1}$ is the saturation of the fluid f1 in the zone Z1, $C_{f1}$ is the compressibility of the fluid f1, $S_{f2}$ is the saturation of the fluid f1 in the zone Z1, $C_{f2}$ is the compressibility of the fluid f2.

In order to monitor the movement of the interface 5 over time, it is necessary to repeat stages b to d of the process by initiating one or more of the effective transient flow conditions at other points in time $T_2$, $T_3$, measuring the effective pressure differences, $\Delta P_{u2}(t)$, $\Delta P_{u3}(t)$ that are produced, making further comparisons with the reference pressure differences, determining the new points in time $\delta_2$, $\delta_3$ and then calculating the other distances $L_2$, $L_3$.

The comparison between the two differences in reference and effective pressure can be achieved by different means, it is possible for example to produce their difference $\Delta P_{ref}(t) - \Delta P_{u1}(t)$ over time or as a function of time, or equally for example, to calculate the derivative of their difference over time or as a function of time. The control and data analysis system 10 can perform these comparisons.

The time function is preferably logarithmic with time because the timings are long, for example for several tens of hours. It can be in the form of:

Log $[(t_p + \Delta t)/\Delta t]$ where $\Delta t$ is the time elapsed since the time $T_1$.

Figure 4:
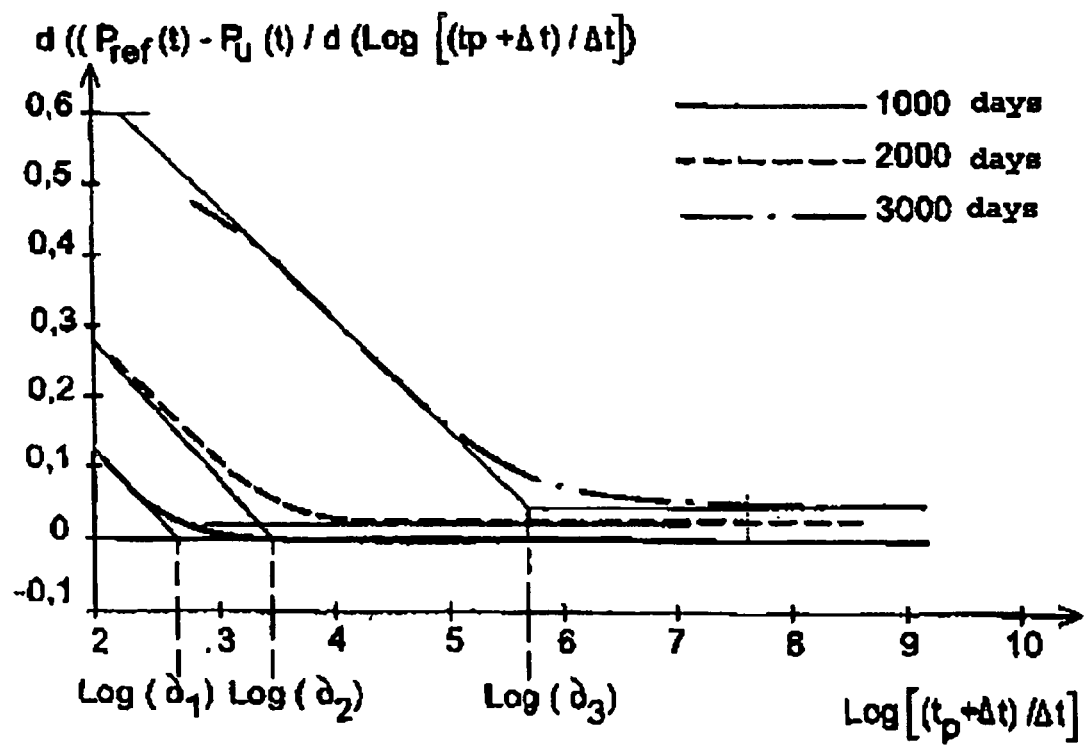
FIG. 4 is a graph showing the comparison measured between the reference pressure difference and the effective pressure difference.

FIG. 4 shows the semi-logarithmic examples of the Horner type of comparisons made between three effective pressure differences $\Delta P_{u1}(t)$, $\Delta P_{u2}(t)$, $\Delta P_{u3}(t)$ and a reference pressure difference of $\Delta P_{ref}(t)$. The three effective pressure differences are obtained from three transient flow conditions initiated at points in time $T_1$=1000 days, $T_2$=2000 days and $T_3$=3000 days of production of the fluid f1. The reference pressure difference $\Delta P_{ref}(t)$ is obtained from a reference transient flow condition initiated at a point in time $T_o$ after a duration $t_p$ equal to 10 days of well production. The points in time of the effective transient flow conditions respectively $T_1$, $T_2$, $T_3$ occur after a duration $t_p$ of production without fluid injection f2. The fluid f2 is again injected at the completion of the measurements of the pressure differences.

The configuration of the reservoir analysed corresponds to that of FIG. 1A with an injection well 7 and a pressure sensor 8 in the production well 1. The first fluid f1 is crude oil and the second fluid f2 is salt water.

The comparison between the differences in pressure after the transient flow conditions is performed using the derivative in the difference between the variation in reference pressure $\Delta P_{ref}(t)$ and one of the effective pressure differences $\Delta P_{u1}(t)$, $\Delta P_{u2}(t)$, $\Delta P_{u3}(t)$ i.e: d $(\Delta P_{ref}(t) - \Delta P_u(t))/d(\text{Log}[(tp + \Delta t)/\Delta t])$.

In FIG. 4, in moving from the right to the left along the horizontal axis, and following the natural scale of elapsed time, the gradients of the annexes are essentially zero, followed by a section where the gradient decreases. Each one shows a change in the gradient. The points in time $\delta_1$, $\delta_2$, $\delta_3$ correspond to the changes in the gradient. More exactly, the abscissa at the intersection point between the gradients of the two sections on the right correspond to the logarithm of the points in time sought $\delta_1$, $\delta_2$, or $\delta_3$. It is then only necessary, knowing the points in time $\delta_1$, $\delta_2$, or $\delta_3$, to calculate the corresponding distance $L_1$, $L_2$, or $L_3$, using the formula (1).

Using the points in time $T_1$, $T_2$, $T_3$, given above and respectively being equal to 1000, 2000, and 3000 days and a non-injection production period $t_p$ before stoppage of 10 days, the points in time obtained from FIG. 4 are as follows:

$\delta_1$=1.4 days after $T_1$ $\delta_2$=0.62 days after $T_2$ $\delta_3$=0.08 days after $T_3$ Using formula (1) these values then enable the interface-pressure sensor distances to be calculated:

$L_1$=320 meters $L_2$=211 meters $L_3$=75 meters

Noting that the values of the parameters used in formula (1) are the following:

$k_1 = 3 \cdot 10^{-1}$ m$^2$ $\Phi_1$=0.2

$\mu_1 = 5.10^{-3}$ Pa.s $Ct_1 = 1.8.10^{-9}$ Pa$^{-1}$

A reservoir model 4 calculated using the parameters given in the following table:

| Parameter | Value (SI units) |
|---|---|
| Porosity | 0.2 |
| Horizontal permeability | $3.10^{-10}$ m$^2$ |
| Vertical permeability/ Horizontal permeability | 0.1 |
| Crude oil viscosity | $5.10^{-3}$ Pa · s |
| Crude oil compressibility | $10^{-9}$ 1/Pa |
| Water viscosity | $0.5.10^{-3}$ Pa · s |
| Water compressibility | $5.10^{-10}$ 1/Pa |
| Model dimension | length = width = depth = 800 meters |
| Distance sensor - injection well | 400 meters | would have produced the following distances:

$L_1 = 300$ meters $L_2 = 220$ meters $L_3 = 85$ meters

The results obtained with the process according to the invention are thus completely satisfactory.

In the preceding description, the effects of gravity on the behaviour of the fluids f1, f2 have been ignored and the interface 5 between the two fluids has been assumed to be more or less vertical. This assumption may be made in the case of reservoirs 4 where the vertical permeability is small, for fluids where the velocity of movement is great or for pairs of fluids f1, f2 with relatively similar densities.

Figure 5:
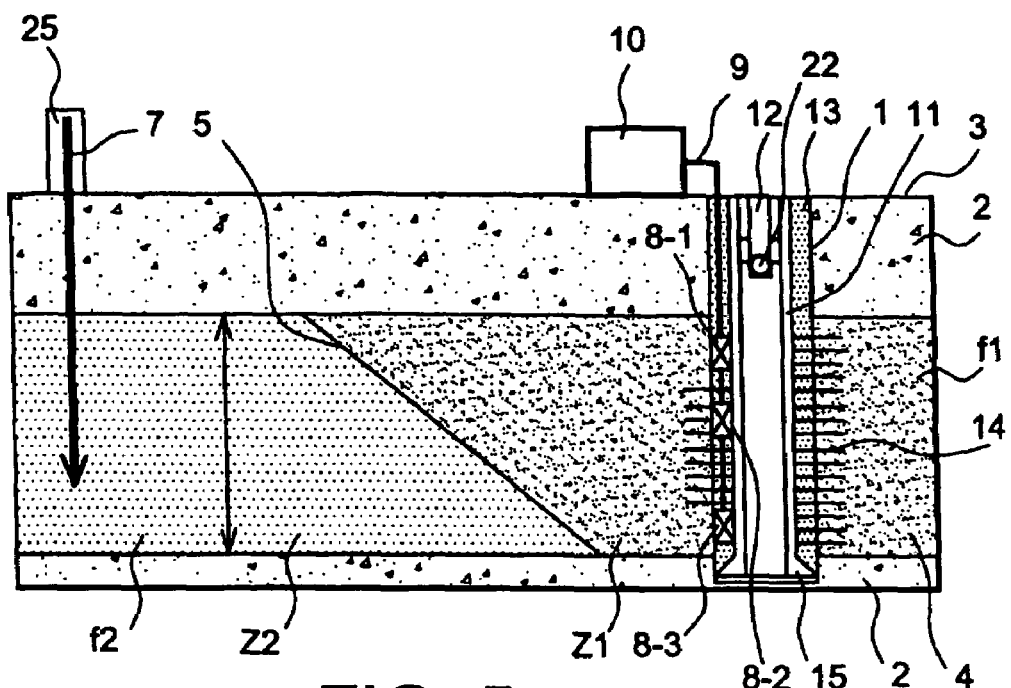
FIG. 5 shows a variant of an installation according to the invention.

In other cases, whilst still considering that the reservoir 4 is comprised of a single layer of mainly homogeneous productive formation, the second fluid f2 will be displaced by the first fluid f1 to the bottom of the reservoir 4. This phenomenon will depend essentially on the difference in density between the two fluids f1, f2. The interface 5 between the two fluids f1, f2 will, rather than remaining more or less vertical, adopt an inclined attitude. In order to follow the position of the interface 5 and its movement, all that is needed is to place several pressure sensors 8-1, 8-2, 8-3, at different depths in the reservoir 4. These pressure sensors 8-1, 8-2, 8-3 may, as previously, be placed in the production well 1 or in a dedicated well 16. In FIG. 5, such a configuration is shown. It is preferable for the pressure sensors 8-1, 8-2, 8-3 to be evenly distributed over the height H of the reservoir 4. If three pressure sensors 8-1, 8-2, 8-3 are used, it is possible to distribute them at approximately equal distances with respect to each other, at quarter, half and three quarter of the height H of the reservoir 4. Each pressure sensor will be used to measure a reference pressure difference and at least one effective pressure difference, and it will be possible to determine for each of the pressure sensors 8-1, 8-2, 8-3 the distance between it and the interface 5. These measurements can be made simultaneously for each of the pressure sensors 8-1, 8-2, 8-3.

In a similar fashion, the reservoir 4, instead of being formed from a single homogeneous productive layer, may be formed from several homogeneous productive layers 20-1, 20-2, 20-3, positioned one on top of each other, these layers of productive formations 20-1, 20-2, 20-3 not being interconnected. This configuration is an extension of the type shown at FIG. 1.

The movement of the second fluid f2 towards the production well 1 happens independently in each of the productive formation layers 20-1, 20-2, 20-3. In each of the layers 20-1, 20-2, 20-3, there will be an interface 5-1, 5-2, 5-3 and it is required to locate the position of each of the interfaces 5-1, 5-2, 5-3.

By placing at least one pressure sensor 8-1, 8-2, 8-3 in each of the productive formation layers 20-1, 20-2, 20-3, measurements equivalent to those described in FIG. 1 may be taken. It is assumed that gravity effects can be ignored in each of the productive formation layers 20-1, 20-2, 20-3. If this were not the case, then each productive formation layer 20-1, 20-2, 20-3 would have to be treated separately as described in FIG. 5.

Figure 6:
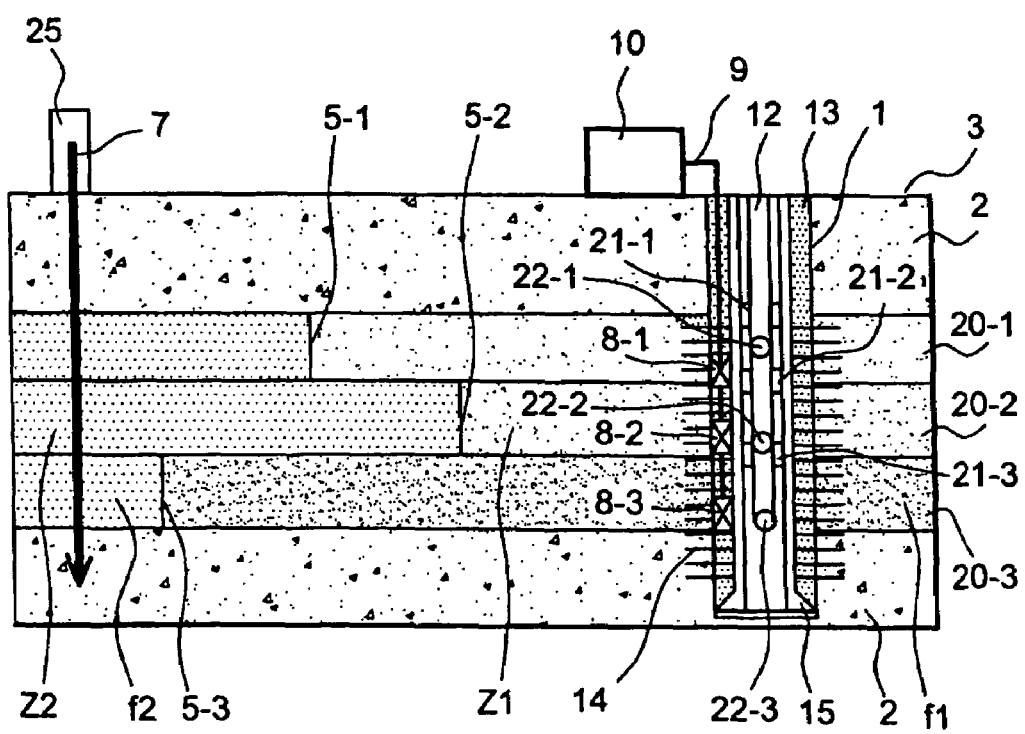
FIG. 6 shows another variant of an installation according to the invention.

In the configuration shown in FIG. 6, the pressure measurements are taken separately in each of the productive layers 20-1, 20-2, 20-3. To avoid producing false readings blanking devices 21-1, 21-2, 21-3 known in English as "packers" are provided in the production well 1, between the casing 11 and the production pipe 12, at the interface between the different productive formation layers 20-1, 20-2, 20-3 and at the top boundary of the reservoir 4. These packers prevent the fluid f1 that is being extracted from moving from one layer to another via the channels 14 and the annular space between the casing 11 and the production pipe 12. They serve to isolate the section of the well 1 where a pressure sensor 8-1 is sited from the section of the well 1 where a second pressure sensor 8-2 is sited.

To avoid a complete shut down of the production well 1 during the pressure measurement exercise, for example in one of the productive formation layers 20-1, valves 22-1, 22-2, 22-3 are installed in the production pipe 12, one at each of the layers of productive formation 20-1, 20-2, 20-3. Thus the production may be shut down in one of the layers 20-1 and a transient flow condition initiated by closing the corresponding valve 22-1, without shutting down the other layers 20-2, 20-3, the corresponding valves 22-2, 22-3 remaining in the open position.

Although several embodiments of this present invention have been depicted and described in detail it is evident that various alterations and modifications may be introduced without departing from the scope of the invention.

The invention claimed is:

1. A method of locating a position of an interface (5) between a first fluid (f1) and a second fluid (f2) in a reservoir (4), the method comprising:
   a°) initiating a reference transient flow condition to produce a reference pressure difference ($\Delta P_{ref}(t)$) in the reservoir (4),
   b°) initiating an effective transient flow condition to produce an effective pressure difference ($\Delta P_{u1}(t)$) in the reservoir (4)
   c°) comparing the pressure differences ($\Delta P_{ref}(t)$, $\Delta P_{u1}(t)$) as a function of time,
   d°) determining a point in time ($\delta_1$) when a pressure wave, generated by said effective transient flow, substantially arrives at the interface (5); and
   e) determining the position of the interface (5) based on the time ($\delta_1$).

2. The method of claim 1 wherein said reference pressure difference ($\Delta P_{ref}(t)$) is measured by way of a pressure sensor (8) located in said reservoir.

3. The method of claim 2, wherein said position of said interface is wherein by a distance (L1) between the pressure sensor (8) and the interface (5), said distance (L1) being expressed by a formula of the type:

$$L_1 = \alpha \sqrt{\frac{k_1 \cdot \delta_1}{\phi_1 \cdot \mu_1 \cdot Ct_1}}$$

in which:
α is a conversion factor which in the international system is equal to 2,
$k_1$ is the horizontal permeability of the zone (Z1) in which the pressure sensor (8) is sited,
$\Phi_1$ is the porosity of the zone (Z1) in which the pressure sensor (8) is sited,
$\mu_1$ is the viscosity of the fluid (f1) contained in the zone (Z1) in which the pressure sensor (8) is sited,
$Ct_1$ is the total compressibility of the zone (Z1) in which the pressure sensor (8) is sited.

4. The method of claim 1, wherein comparing includes calculating one of a difference and a function of the difference between the variations of the reference $\Delta P_{ref}(t)$ and of effective (, $\Delta P_{u1}(t)$ pressures measured.

5. Method of location according to claim 9, wherein in that the difference or the function of the difference is a derivative function.

6. The method of claim 5, wherein the derivative function is expressed relative to a logarithmic time function.

7. The method according to claim 1, wherein comparing further includes determining a point in time ($\delta_1$) where the derivative changes value at the moment when the pressure wave reaches the interface (5).

8. The method of claim 1 wherein initiating said reference transient flow condition and said effective transit flow condition includes creating a change in a production flow rate of a well passing through said reservoir.

9. The method of claim 8 wherein creating a change in said production flow rate includes reducing said production flow rate.

10. The method of claim 8, wherein creating the change in flow rate includes stopping the production.

11. The method of claim 8 wherein said change in said production flow rate is created by way of at least one valve coupled to said well.

12. The method of claim 1, wherein the fluid (f1) is extracted for a period (tp) prior to the initiation of the reference transient flow condition.

13. The method of claim 12, including injecting fluid (f2) in the reservoir after measuring the reference pressure difference ($\Delta P_{ref}(t)$).

14. The method of claim 13, including halting the injection of the fluid (f2) before initiation of the effective transient flow condition and recommencing the injection of fluid f2 after measuring the effective pressure difference ($\Delta P_{u1}(t)$).

15. The method of claim 14, wherein the duration ($t_p$) of the period during which the injection is halted prior to the initiation of the effective transient flow condition is approximately the same as the duration of production before the reference transient flow condition is initiated.

16. The method of claim 1, wherein the fluid (f2) is present naturally in the reservoir (4).

17. The method of claim 12, wherein the production well (1) produces for approximately the same time ($t_p$) prior to initiation of the reference transient flow condition and prior to initiation of the effective transient flow condition.

18. The method of claim 12, wherein the production well (1) is closed prior to the start of the production time ($t_p$) preceding the initiation of the effective transient flow condition.

19. Installation for locating the position of an interface (5) between two fluids (f1, f2) in a reservoir (4), the installation comprising:
means (22) for initiating in the reservoir (4) a reference transient flow condition that produces a reference pressure difference ($\Delta P_{ref}(t)$), and at a later time ($T_1$), an effective transient flow condition that generates a pressure wave that propagates within the reservoir (4) producing a difference in the effective pressure ($\Delta P_{u1}(t)$), and,
a means (10) for comparing the pressure differences ($\Delta P_{ref}(t)$, $\Delta P_{u1}(t)$) over time or as a function of time and for determining, using the comparison, a point in time ($\delta_1$) which represents the time when the pressure wave substantially reaches the interface (5) between the two fluids (f1, f2), said means (10) using ($\delta_1$) for determining the position of the interface (5).

20. The installation of claim 19 further including a pressure sensor (8) to measure the reference pressure difference ($\Delta P_{ref}(t)$) and the difference in the effective pressure ($\Delta P_{u1}(t)$.

21. The installation of claim 20 wherein the pressure sensor (8) is located within a production well (1) passing through said reservoir (4).

22. The installation according to claim 21, wherein the means (22) of initiating includes at least one valve controlling the flow of the production well (1).

23. Installation according to claim 20, wherein the pressure sensor (8) is located in a dedicated well (16) away from a production well (1), said production and dedicated wells passing through said reservoir (4).

24. Installation according to claim 19, wherein at least one injection well (7) passing through said reservoir is adapted to inject the second fluid (f2) into the reservoir (4).

25. Installation according to claim 24 wherein said injection well coupled to means (25) for controlling the injection.

26. Installation according to claim 19, further comprising several pressure sensors (8-1, 8-2, 8-3) spaced apart over a height (H) of the reservoir (4).

27. Installation according to claim 26, wherein the reservoir (4) comprises several layers of productive formations (20-1, 20-2, 20-31, wherein at least one of the pressure sensors (8-1, 8-2, 8-3) is located within each of the layers of productive formations (20-1, 20-2, 20-3).

28. Installation according to claim 27, wherein the production well (1) is equipped with means (22-1, 22-2, 22-3) to halt the production at one of the layers of productive formation without stopping the well (1) production.

29. Installation according to claim 28, the installation comprising means (21-1, 21-2, 21-3), to isolate the section of the well (1) where the pressure sensor (8-1) is located from the section of the well (1) where the other pressure sensor (8-2) is located.

* * * * *